United States Patent Office 3,057,865
Patented Oct. 9, 1962

3,057,865
PREPARATION OF ALLOXAZINE AND ISO-ALLOXAZINE COMPOUNDS
Thomas J. Bardos, Chicago, Donald B. Olsen, Tinley Park, and Takashi Enkoji, Park Forest, Ill., assignors to Armour Pharmaceutical Company, Chicago, Ill., a corporation of Delaware
No Drawing. Filed May 31, 1960, Ser. No. 32,576
6 Claims. (Cl. 260—251.5)

This invention relates to the preparation of alloxazine and isoalloxazine compounds, and more particularly to the preparation of riboflavin and riboflavin anologs.

This patent application is in part a continuation of application Serial No. 631,066, filed December 28, 1956, and now abandoned.

In U.S. Patent No. 2,867,614, which patent resulted from an application copending with the application of which this is in part a continuation, there is described, in Example III thereof, the preparation of 2,4-diamino-2,4-desoxylumichrome by the condensation of 2,4,5,6-tetraaminopyrimidine with 4,5-dimethyl-1,2-benzoquinone by refluxing an acid solution. The yield of condensation product obtained by this method, rather than being 23%, would actually be about 50%, and under appropriate conditions the yield of condensation product can be at least 90%.

It has been discovered that an orthobenzoquinone can be condensed with a heterocyclic orthodiamine to obtain the corresponding condensation product in significantly increased yields, providing the condensation reaction mixture is one in which the oxidative effect of the orthobenzoquinone toward the heterocyclic amine is substantially eliminated. In other words, the reaction mixture should contain the orthobenzoquinone in a non-oxidizing diketo form and should be substantially free of the peroxide-isomer of the quinone.

We have established that the relatively poor yields obtained previously in the condensation of a heterocyclic orthodiamine compound with an orthobenzoquinone in aqueous acetic acid solutions was due to the oxidative property (high oxidation potential) of the orthobenzoquinones. This is in marked contrast with the behavior of polycyclic orthoquinones, like 1,2-napthoquinone and phenanthrenequinone, which have lower oxidation potentials than the orthobenzoquinones, and react with heterocyclic orthodiamines in the same manner as 1,2-diketones do, giving the corresponding condensation products in satisfactory yields. On the other hand, where an orthobenzoquinone is allowed to react with a similar orthodiamine in an aqueous medium, the former acts as an oxidizing agent toward the diamino compound (since the latter is usually especially sensitive toward oxidation) rather than in the manner of other 1,2-dicarbonyl compounds; thus, the oxidative destruction of the diamino compound proceeds at a much faster rate than the condensation reaction, and the yields obtained in the latter are consequently poor.

This powerful oxidative property of othobenzoquinones toward the diamino compounds could be, in part, due to the presence of a peroxide-isomer of the othobenzoquinone in equilibrium with the dicarbonyl form, as it was suggested by Willstatter and Muller (Ber., 44, 2171 [1911]). Even a very small amount of this peroxide-isomer in the aqueous condensation mixture would be sufficient to inbit the condensation reaction, presumably, by reacting with the pyrimidine at a faster rate than does the quinone, and thus shifts the quinone-peroxide equilibrium of the reaction in the direction of peroxide formation. Not only does the peroxide-isomer serve to inhibit the condensation product, but such peroxide-isomer may oxidize the heterocyclic amine, and thereby render it unavailable for condensation with the orthobenzoquinone. Moreover, although the reaction mixture may contain initially only an insignificant amount of the peroxide isomer, as the reaction proceeds the conversion of the diketo form of the quinone to the peroxide-isomer is obtained at an increased rate and as a consequence a decreasing quantity of the quinone reactant is capable of condensing with the heterocyclic amine.

In one aspect of this invention the condensation of an orthobenzoquinone with a heterocyclic amine may be obtained with significantly increased yield by including a bisulfite in the reaction mixture. It will be understood that the bisulfite may be included in the reaction mixture either independently as an inorganic bisulfite salt like sodium bisulfite or in combination with the heterocyclic amine reactant as when the latter is used in the form of the bisulfite salt. The mechanism by which the bisulfite accomplishes this result is not as yet completely understood, but it is believed that the bisulfite stabilizes the diketo form of the orthobenzoquinone to prevent conversion thereof to the peroxide-isomer.

Alternatively, the bisulfite might exert its action as a reducing agent, i.e. by protecting the diamino compound from oxidation by the orthobenzoquinone. Although the bisulfite may be employed effectively for this purpose, other reducing agents may be added to the condensation reaction mixture for inhibiting the undesirable oxidative side reaction, such as hydroquinone, sulfhydro compounds, inorganic sulfides, sulfites and hydrosulfites.

In another aspect of this invention, this condensation product can be prepared in substantially theoretical yield by reacting the heterocyclic amine with the dimer of the orthobenzoquinone which has no oxidative properties. The use of this dimer, rather than the monomeric orthobenzoquinone, apparently also stabilizes the diketo form of the orthobenzoquinone and thus renders the condensation reaction mixture substantially free from the peroxide isomer.

The polymeric orthobenzoquinones, including the dimeric form of some orthobenzoquinones, have been described by Teuber and Staiger in Chemische Berichte; 88 (802–827), 1955. In the method of this invention, the dimeric orthobenzoquinones can be employed directly in the condensation reaction, or can be obtained by allowing a solution of the monomeric orthobenzoquinone to stand at room temperature for a period of time such as to complete the conversion thereof to the dimer. However, the rate of this dimerization is increased at an elevated temperature, and under refluxing conditions the conversion of the monomeric orthobenzoquinone may be obtained in a relatively short period of time. Also, the advantages of this invention can be achieved with the formation of the dimer in situ by condensing a solution of the monomeric orthobenzoquinone at an elevated temperature, preferably under refluxing conditions.

In preparing riboflavin and riboflavin analogs according to this invention the dimeric orthobenzoquinone can be derived from a monomeric orthobenzoquinone represented by the formula

in which R and R' can be hydrogen or an alkyl or alkoxy radical containing less than 5 carbon atoms. Better results are obtained when R' is hydrogen and R is either an alkyl or an alkoxy radical containing less than 3 carbon atoms. Especially desirable results are achieved when R is a methyl radical and when R′ is hydrogen. Exemplary monomeric orthobenzoquinones from which the corresponding dimer can be derived are 4,5-dimethyl-orthobenzoquinone, 4-methyl-orthobenzoquinone, 4,5-diethyl - orthobenzoquinone, 4,5 - diisopropyl-orthobenzoquinone, and the like.

In accordance with this invention, the dimeric orthobenzoquinone can be reacted with a heterocyclic amine or pyrimidine compound represented by the formula

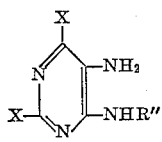

in which X is halogen, sulfhydryl, hydrogen, hydroxy, amine or an alkyl or an oxygen-containing alkyl radical, and in which R″ is hydrogen or an alkyl or an oxygen-containing alkyl radical having less than 6 carbon atoms. Better results are obtained when at least one X in this formula is an amino group.

Still better results are achieved when R″ is hydrogen or an alkyl group containing less than 3 carbon atoms or a hydroxy-alkyl group containing less than 6 carbon atoms. Especially desirable results are obtained when R″ is either a ribityl or ribosyl radical. Exemplary of the heterocyclic amines suitable for employment in this condensation reaction are 5,6-diamino uracil, 4,5,6-triamino-2-oxypyrimidine, 4,5,6-triamino-2-thiopyrimidine, 2,4,5 - triamino - 6 - methyl pyrimidine, 2,4,5 - triamino pyrimidine, 4,5,6-triaminopyrimidine, and the like, as well as the salts of said amines with various acids, such as for example the sulfate, nitrate, sulfide, formate, acetate salts of said amines.

The condensation of the dimeric orthobenzoquinone with the heterocyclic amine can be achieved under alkaline, neutral or acid conditions. However, the condensation proceeds at an alkaline pH and room temperature at a rapid rate, while at a neutral or acid pH completion of the condensation reaction is obtained in a somewhat longer period of time, and preferably the condensation is carried out at elevated temperatures or under refluxing conditions.

The condensation reaction product may precipitate during the course of the reaction, and such precipitate may be separated from residual liquid to provide a concentrate of such reaction product. When the condensation reaction product does not precipitate in the course of the reaction, it may be recovered by precipitation at a pH different from that at which the condensation was obtained or by adding to the reaction mixture an organic solvent such as ethyl alcohol.

This invention can be further illustrated by the following specific examples:

Example I

Dimeric 4,5-dimethyl-orthobenzoquinone can be obtained by the following method:

3,4-dimethyl phenol, in the amount of 537 gms. (4.4 moles), was dissolved in 8 liters of a 10% solution of sodium hydroxide. The resulting solution was cooled to a temperature of from 0 to 5° C. To the cooled solution was added, with stirring, a cold solution of benzene diazonium chloride, freshly prepared by the addition of 325 gms. of sodium nitrite to an ice-cold solution of 395 gms. of aniline in 770 ml. of concentrated hydrochloric acid and 2200 ml. of water. The resulting mixture was stirred at a temperature of 5° C. for a period of at least 2 hours, and the orange-red precipitate thereupon formed was separated from the supernatant liquid by filtration. The separated precipitate contained a mixture of two isomeric azo derivatives of 3,4-dimethyl phenol from which the 6-(2) phenyl-azo-3,4-(4,5) dimethyl phenol isomer was isolated by recrystallization from 95% ethanol. The isolated isomer was obtained in a yield of 764 gms., which by calculation was found to be 73.7% of the theoretical yield.

The 6-phenylazo-3,4-dimethyl phenol product, in the amount of 382 gms. (2.81 moles), was dissolved in 8 liters of a 10% sodium hydroxide solution at boiling temperature. While the solution was maintained at the boiling temperature, 940 gms. of sodium hydrosulfite was added, portion-wise, until a clear, light-yellow solution had been obtained. This solution was cooled to a temperature of 50° C. and then neutralized with concentrated hydrochloric acid. The neutralized solution in which there was formed a precipitate, was cooled to a temperature of from 0 to 5° C. and maintained at such temperature for a period of 5 hours. Then the precipitate was collected on a Buchner funnel, washed with water, and dried. The dried product, which was identified as 2-amino-4,5-dimethylphenol, was obtained in yield of 201.5 gms. This represented 89% of the theoretical yield.

The 2-amino-4,5-dimethyl phenol product, in the amount of 7.4 gms. (0.053 mole), was dissolved in a solution consisting of 500 ml. of water and 13 ml. of concentrated sulfuric acid. The resulting solution was poured rapidly, with stirring, into a solution consisting of 12 gms. (0.41 mole) of potassium dichromate in 500 ml. of water. This deep red-brown solution was mixed immediately with 200 ml. of chloroform. The chloroform phase thereupon formed was separated from the aqueous phase. The separated chloroform phase was dried over anhydrous sodium sulfate. The dehydrated chloroform solution was then concentrated to dryness under reduced pressure. The residue after evaporation of the chloroform consisted of crystals of monomeric 4,5-dimethyl orthobenzoquinone. These crystals were washed with cold ether and dried. The crystalline product, which demonstrated a melting point of 95° C., was obtained in a yield of 2.9 gms. This represented 40% of the theoretical yield.

The monomeric 4,5-dimethyl-orthobenzoquinone, in the amount of 6 gms., was dissolved in 20 ml. of glacial acetic acid. The resulting solution was diluted with 80 ml. of water, and after storing the dilute solution at room temperature for a period of 3 days, the yellow-colored dimeric 4,5-dimethyl-orthobenzoquinone was obtained as a precipitate. This precipitate was separated from residual liquid, washed with water and dried. The dried product was obtained in a yield of 3.6 gms.

An additional 0.4 gm. of the dimer was obtained from the mother liquor by further dilution with water and storage at room temperature. The combined precipitates were recrystallized from isopropanol. This recrystallized product demonstrated a melting point of 178–180° C.

Example II

Lumichrome (6,7-dimethyl alloxazine) was synthesized by the following method:

The dimeric 4,5-dimethyl-orthobenzoquinone, obtained by the method of Example I, in the amount of 1.36 gms. (0.005 mole), was dissolved in 50 ml. of water by the addition thereto of a few drops of a 10% sodium hydroxide solution. The resulting solution was added to a solution of 3.82 gms. (0.01 mole) of 5,6-diaminouracil sulfate in 50 ml. of water. Then the solution was stored overnight at room temperature. Then the solution was neutralized with acid, and the precipitate thereupon formed was separated from the supernatant liquid, washed with water and acetone and dried. The dried product, which was identified as lumichrome by ultraviolet adsorption and chemical analysis, was obtained in a yield of 1.64 gms. This represented 68% of the theoretical yield.

Example III 4-amino-4-deoxyalloxazine was synthesized by the following method:

A solution of 0.48 gm. (0.002 mole) of 4,5,6-triamino-2-oxypyrimidine sulfate in 60 ml. of water was neutralized to pH 7 by the addition thereto of a 10% sodium hydroxide solution. To the neutralized solution was added a solution of 0.41 gm. (0.0015 mole) of dimeric 4,5-dimethyl-orthobenzoquinone obtained by the method of Example I in 5 ml. of 95% ethanol. The resulting mixture was heated on a steam bath with occasional shaking for a period of 4 hours, and thereafter such mixture was stored overnight. The precipitate thereupon formed was separated from the supernatant liquid by filtration, washed with water, and dried under vacuum. The dried product, which was identified as 4-amino-4-deoxyalloxazine, was obtained in a yield of 0.34 gm. This represented 71% of the theoretical yield.

*Example IV*

2-thio-4-amino-4-deoxyalloxazine was synthesized by the following method:

A solution of 0.5 gm. (0.002 mole) of 4,5,6-tri-amino-2-thiopyrimidine sulfate in 100 ml. of warm water was neutralized to pH 7 with a 10% sodium hydroxide solution. To the neutralized solution was added a solution of 0.41 gm. (0.0015 mole) of dimeric 4,5-dimethyl-orthobenzoquinone obtained by the method of Example I in 5 ml. of 95% ethanol. The resulting mixture was heated on a steam bath with occasional shaking for a period of 4 hours, and thereafter such mixture was stored overnight. The precipitate thereupon formed was separated from the supernatant liquid by filtration, washed with water and alcohol and dried under vacuum. The dried product, which was identified as 2-thio-4-amino-4-deoxyalloxazine, was obtained in a yield of 0.51 gm. This represented 100% of the theoretical yield.

*Example V*

2-amino-4-methyl-2,4-deoxyalloxazine was synthesized by the following method:

A solution of 0.475 gm. (0.002 mole) of 2,4,5-triamino-6-methyl pyrimidine sulfate in 16 ml. of warm water was neutralized to pH 7 by the addition thereto of a 10% sodium hydroxide solution. To the neutralized solution was added a solution of 0.41 gm. (0.0015 mole) of dimeric 4,5-dimethyl-orthobenzoquinone obtained by the method of Example I in 5 ml. of 95% ethanol. The resulting mixture was heated on a steam bath with occasional shaking for a period of 4 hours, and thereafter such mixture was stored overnight. The precipitate thereupon formed was separated from the supernatant liquid, washed with water and alcohol and dried under vacuum. The dried product, which was identified as 2-amino-4-methyl-2,4-deoxyalloxazine, was obtained in a yield of 0.43 gm. This represented 90% of the theoretical yield.

*Example VI*

2-amino-2,4-deoxyalloxazine was synthesized by the following method:

A solution of 0.25 gm. (0.02 mole) of 2,4,5-triamino pyrimidine in 100 ml. of warm water was heated on a steam bath, and the insoluble matter therein was removed by filtration. To the clarified filtrate thereby obtained was added a solution of 0.41 gm. (0.0015 mole) of dimeric 4,5-dimethyl-orthobenzoquinone obtained by the method of Example I in 5 ml. of 95% ethanol. The resulting mixture was heated on a steam bath for a period of 4 hours, and thereafter was stored for a period of 4 hours. The precipitate thereupon formed was separated from the supernatant liquid by filtration, washed with water and alcohol and dried under vacuum. The dried product, which was identified as 2-amino-2,4-deoxyalloxazine, was obtained in a yield of 0.38 gm. This represented 84% of the theoretical yield.

*Example VII*

2,4-diamino-6,7-dimethyl deoxyalloxazine was synthesized by the following method:

67 gms. of dimeric 4,5-dimethyl-orthobenzoquinone was dissolved in 250 ml. of water by the drop-wise addition of 0.1% sodium hydroxide solution. This solution was then combined with a solution of 200 gms. of 2,4,5,6-tetraaminopyrimidine sulfate dissolved in 2 liters of water by the addition of 600 ml. of 10% sodium hydroxide. After standing for 3 days at room temperature, the precipitated product was collected on a filter, washed with water, then with acetone, and dried. Yield 76 gms.

*Example VIII*

4-amino-2,4-deoxyalloxazine was prepared by the following method:

A solution of 1.12 gm. (.005 mole) of 4,5,6-triaminopyrimidine sulfate in 100 ml. of warm water was neutralized to pH 7 by the addition of 10% NaOH solution. To this was added a solution of 1.02 gm. (.0075 mole) of 4,5-dimethyl-o-benzoquinone (M.P. 178–180° C.) in 25 ml. of 95% ethanol. The mixture was heated on the steam bath with occasional shaking for 4 hours and permitted to stand overnight.

The precipitated solid was collected by filtration, washed with water and dried under vacuum to yield 1.00 gm. (88%) of 4-amino-2,4-deoxyalloxazine.

*Example IX*

The following demonstrates the advantages obtained by employing pyrimidine bisulfite, rather than pyrimidine sulfate, in the condensation reaction with the monomeric quinone:

To a solution of .493 gm. (.0018 mole) of 2,4,5,6-tetraaminopyrimidine sulfate dihydrate in 15 ml. of water was added a solution of .243 gm. (.0018 mole) of the monomeric quinone in 5 ml. of glacial acetic acid. The mixture was refluxed for 2 hours and permitted to stand overnight.

The mixture was cooled in an ice-bath and neutralized with concentrated $NH_4OH$ and the precipitated solid was collected by centrifugation. The solid was then washed successively with 4 ml. of water and 2 portions of 4 ml. of absolute ethanol and dried under vacuum to yield .051 gm. (12%) of 2,4-diimino-2,4-deoxyalloxazine.

To a solution of 0.311 gm. (.0014 mole) of 2,4,5,6-tetraaminopyrimidine bisulfite in 15 ml. of water was added a solution of .185 gm. (.0014 mole) of the monomeric quinone in 5 ml. of glacial acetic acid. The mixture was refluxed for 2 hours and permitted to stand overnight.

The mixture was cooled in an ice-bath and neutralized with concentrated $NH_4OH$ and the precipitated solid was collected by centrifugation. The solid was then washed successively with 4 ml. of water and 2 portions of 4 ml. of absolute ethanol and dried under vacuum to yield .080 gm. (24%) of 2,4-diimino-2,4-deoxyalloxazine.

*Example X*

The following demonstrates the advantages of employing the dimerized quinone rather than the monomeric quinone:

A solution of .384 gm. (.0014 mole) of 2,4,5,6-tetraaminopyrimidine sulfate dihydrate in 50 ml. of warm water was neutralized to pH 7 by the addition of 10% NaOH solution. A solution of .200 gm. (.0015 mole) of the monomeric quinone in 10 ml. of acetone was added and the mixture heated on the steam-bath for 4 hours and permitted to stand overnight. The precipitated solid was removed by centrifugation, washed successively with 4 ml. of water and 2 portions of 4 ml. of absolute ethanol and dried under vacuum to yield .073 gm. (22%) of 2,4-diamino-2,4-deoxyalloxazine.

A solution of .384 gm. (.0014 mole) of 2,4,5,6-tetraaminopyrimidine sulfate dihydrate in 50 ml. of warm water was neutralized to pH 7 with 10% NaOH solution. To this was added .200 gm. (.0014 equivalent) of the dimeric quinone (178–180° C.) and the mixture was heated on the steam-bath for 4 hours and then permitted to stand overnight.

The precipitated solid was collected by centrifugation, washed successively with 4 ml. of water and 2 portions of 4 ml. of absolute ethanol and dried under vacuum to yield .261 gm. (78%) of 2,4-diamino-2,4-deoxyalloxazine.

Example XI

Riboflavin can be prepared by the following method:

6-aminouracil is reacted with an equivalent amount of sodium nitrite in a dilute aqueous hydrochloric acid solution to obtain 5-nitroso-6-aminouracil. The latter compound is condensed with an excess of ribose in the presence of zinc chloride to provide the corresponding Schiff base. The latter compound is reduced with hydrogen in the presence of platinum oxide catalyst to obtain 5-amino-6-(ribityl)aminouracil.

A solution of the 5-amino-6-(ribityl)aminouracil in 100 ml. of warm water is neutralized to pH 7 by the addition of a 10% sodium hydroxide solution. To the neutralized solution is added a solution of dimeric 4,5-dimethyl-o-benzoquinone in 25 ml. of 95% ethanol, employing a ratio of about 1.5 moles of quinone per mole of aminouracil. The resulting mixture is heated on a steam-bath with occasional shaking for a period of 4 hours, and then permitted to stand overnight.

The precipitate thereupon formed is collected by filtration, washed with water and dried under vacuum. This dry product is riboflavin.

Example XII 6,7-dimethyl-9-(ribosyl)isoalloxazine can be prepared by the following method:

5-nitroso-6-aminouracil, obtained by the method of Example XI, is condensed with an excess of bromacetyl ribose to obtain 5-nitroso-6-(ribosyl)aminouracil. The latter compound is reduced with sodium hydrosulfide to obtain 5-amino-6-(ribosyl)aminouracil.

A solution of the 5-amino-6-(ribosyl)aminouracil is condensed with a solution of dimeric 4,5-dimethyl-o-benzoquinone, in the ratio of about 1.5 moles of quinone per mole of aminouracil, according to the method of Example XI, to obtain 6,7-dimethyl-9-(ribosyl)isoalloxazine.

While in the foregoing specification various aspects of this invention have been described and specific details thereof have been set forth for the purpose of illustration, it will be apparent to those skilled in the art that this invention is susceptible to other aspects and that many of these details may be varied widely without departing from the concept and spirit of the invention.

We claim:

1. In a process for preparing alloxazine and isoalloxazine compounds by reacting an orthobenzoquinone with a heterocyclic amine having the formula

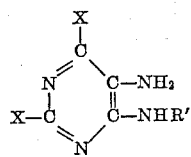

wherein X is selected from the group consisting of hydrogen, sulfhydryl, hydroxy and amino, and in which R' is selected from the group consisting of hydrogen, alkyl radicals containing less than 3 carbon atoms, ribosyl and ribityl, the improvement comprising the step of condensing said heterocyclic amine with a dimer of an orthobenzoquinone having the formula

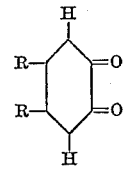

wherein R represents alkyl radicals containing less than 3 carbon atoms while maintaining the reaction substantially free from the monomeric orthobenzoquinone.

2. A process according to claim 1 for preparing 6,7-dimethyl alloxazine wherein said dimer is dimeric 4,5-dimethyl orthobenzoquinone and said heterocyclic amine is 5,6-diaminouracil.

3. A process according to claim 1 for preparing 4-amino-4-deoxyalloxazine wherein said dimer is dimeric 4,5-dimethyl orthobenzoquinone and said heterocyclic amine is 4,5,6-triamino-2-oxypyrimidine.

4. A process according to claim 1 for preparing 2-amino-4-methyl-2,4-deoxyalloxazine wherein said dimer is 4,5-dimethyl orthobenzoquinone and said heterocyclic amine is 2,4,5-triamino-6-methyl pyrimidine.

5. A process according to claim 1 for preparing 2-amino-2,4-deoxyalloxazine wherein said dimer is dimeric 4,5-dimethyl orthobenzoquinone and said heterocyclic amine is 2,4,5-triamino pyrimidine.

6. A process according to claim 1 for preparing 2,4-diamino-6,7-dimethyl-2,4-deoxyalloxazine wherein said dimer is 4,5-dimethyl orthobenzoquinone and said heterocyclic amine is 2,4,5,6-tetraaminopyrimidine.

References Cited in the file of this patent

UNITED STATES PATENTS 2,867,614    Bardos et al.            Jan. 6, 1959